(12) United States Patent
Smith et al.

(10) Patent No.: US 9,787,109 B2
(45) Date of Patent: Oct. 10, 2017

(54) BATTERY PACK

(71) Applicant: LG Chem, Ltd., Seoul (KR)

(72) Inventors: Alexander Jeffrey Smith, White Lake, MI (US); Anthony Arena, Macomb, MI (US); Juil Yum, Ann Arbor, MI (US); Adam Henry Jin Wah Yee Ing, Clawson, MI (US)

(73) Assignee: LG Chem, Ltd., Seoul (KR)

( * ) Notice: Subject to any disclaimer, the term of this patent is extended or adjusted under 35 U.S.C. 154(b) by 266 days.

(21) Appl. No.: 14/695,367

(22) Filed: Apr. 24, 2015

(65) Prior Publication Data

US 2016/0315364 A1  Oct. 27, 2016

(51) Int. Cl.
*H02J 7/00* (2006.01)
*H01M 10/613* (2014.01)
*H01M 10/63* (2014.01)
*H01M 10/6563* (2014.01)

(52) U.S. Cl.
CPC ......... *H02J 7/0021* (2013.01); *H01M 10/613* (2015.04); *H01M 10/63* (2015.04); *H01M 10/6563* (2015.04)

(58) Field of Classification Search
USPC ....................................................... 320/112
See application file for complete search history.

(56) References Cited

U.S. PATENT DOCUMENTS

| | | | |
|---|---|---|---|
| 8,492,642 B2 | 7/2013 | Kim | |
| 2005/0111167 A1* | 5/2005 | Yamaguchi | B60L 15/007 361/676 |
| 2012/0263988 A1* | 10/2012 | Obasih | H01M 10/625 429/98 |

FOREIGN PATENT DOCUMENTS

| | | |
|---|---|---|
| JP | 2008251378 | 10/2008 |
| JP | 2013055019 A | 3/2013 |
| KR | 1020060102855 A | 11/2006 |
| KR | 1020140059899 A | 10/2015 |

OTHER PUBLICATIONS

U.S. Appl. No. 14/273,572, filed May 9, 2014 entitled Battery Pack and Method of Assembling the Battery Pack.

(Continued)

*Primary Examiner* — Robert Grant
(74) *Attorney, Agent, or Firm* — Buckert Patent & Trademark Law Firm PC; John F. Buckert

(57) ABSTRACT

A battery pack includes a battery pack housing defining an interior region with first and second interior spaces and an intermediate space. The battery pack housing includes inlet and outlet apertures communicating with the first and second interior spaces, respectively. The battery pack has a battery module disposed in the first interior space having a first battery cell and a heat exchanger. The heat exchanger defines a first flow path portion therethrough. The battery pack has a fan assembly disposed in the intermediate space having a first electric fan, and a thermally conductive housing disposed in the second interior space that defines a second flow path portion. The first electric fan urges air to flow through the inlet aperture, the first flow path portion, a portion of the first electric fan, the second flow path portion, and the outlet aperture.

15 Claims, 13 Drawing Sheets

(56) References Cited

OTHER PUBLICATIONS

U.S. Appl. No. 14/273,586, filed May 9, 2014 entitled Battery Module and Method of Assembling the Battery Module.
U.S. Appl. No. 14/287,291, filed May 27, 2014 entitled Battery Pack and Method of Controlling an Electric Fan in the Battery Pack.
U.S. Appl. No. 14/489,613, filed Sep. 18, 2014 entitled Battery Pack and Method of Contolling an Electric Fan in the Battery Pack.
International Search Report for International application No. PCT/KR2016/003016 dated Jul. 25, 2016.

* cited by examiner

| FAN SPEED PERCENTAGE VALUE | BATTERY CELL TEMPERATURE (°C) | DC-DC VOLTAGE CONVERTER TEMPERATURE (°C) | |
|---|---|---|---|
| 0 | <38 | <88 | 502 |
| 0.1 | 38 | 88 | 504 |
| 0.2 | 40 | 90 | 506 |
| 0.3 | 42 | 92 | 508 |
| 0.4 | 44 | 94 | 510 |
| 0.5 | 45 | 96 | 512 |
| 0.6 | 46 | 98 | 514 |
| 0.7 | 47 | 100 | 516 |
| 0.8 | 48 | 102 | 518 |
| 0.9 | 49 | 105 | 520 |
| 1.0 | >50 | >110 | 522 |

US 9,787,109 B2

BATTERY PACK

BACKGROUND

The inventors herein have recognized a need for a battery pack having an internal fan assembly that reduces an amount of noise emitted from the battery pack.

SUMMARY

A battery pack in accordance with an exemplary embodiment is provided. The battery pack includes a battery pack housing defining an interior region. The interior region has a first interior space, a second interior space, and an intermediate space. The intermediate space is disposed between and fluidly communicates with the first and second interior spaces. The battery pack housing further includes an inlet aperture and an outlet aperture extending therethrough. The inlet aperture is disposed directly adjacent to the first interior space. The outlet aperture is disposed directly adjacent to the second interior space. The battery pack further includes a battery module that is disposed in the first interior space of the battery pack housing proximate to the inlet aperture. The battery module includes a first battery cell and a heat exchanger disposed against one another. The heat exchanger defines a first flow path portion therethrough. The battery pack further includes a fan assembly that is disposed in the intermediate space of the battery pack housing. The fan assembly has a first electric fan. The battery pack further includes a thermally conductive housing that is disposed in the second interior space of the battery pack housing proximate to the outlet aperture of the battery pack housing. The thermally conductive housing defines a second flow path portion between the thermally conductive housing and the battery pack housing. The first electric fan is adapted to urge air to flow through the inlet aperture, the first flow path portion, a portion of the first electric fan, the second flow path portion, and the outlet aperture of the battery pack housing to cool the battery module.

DETAILED DESCRIPTION

Figure 1:
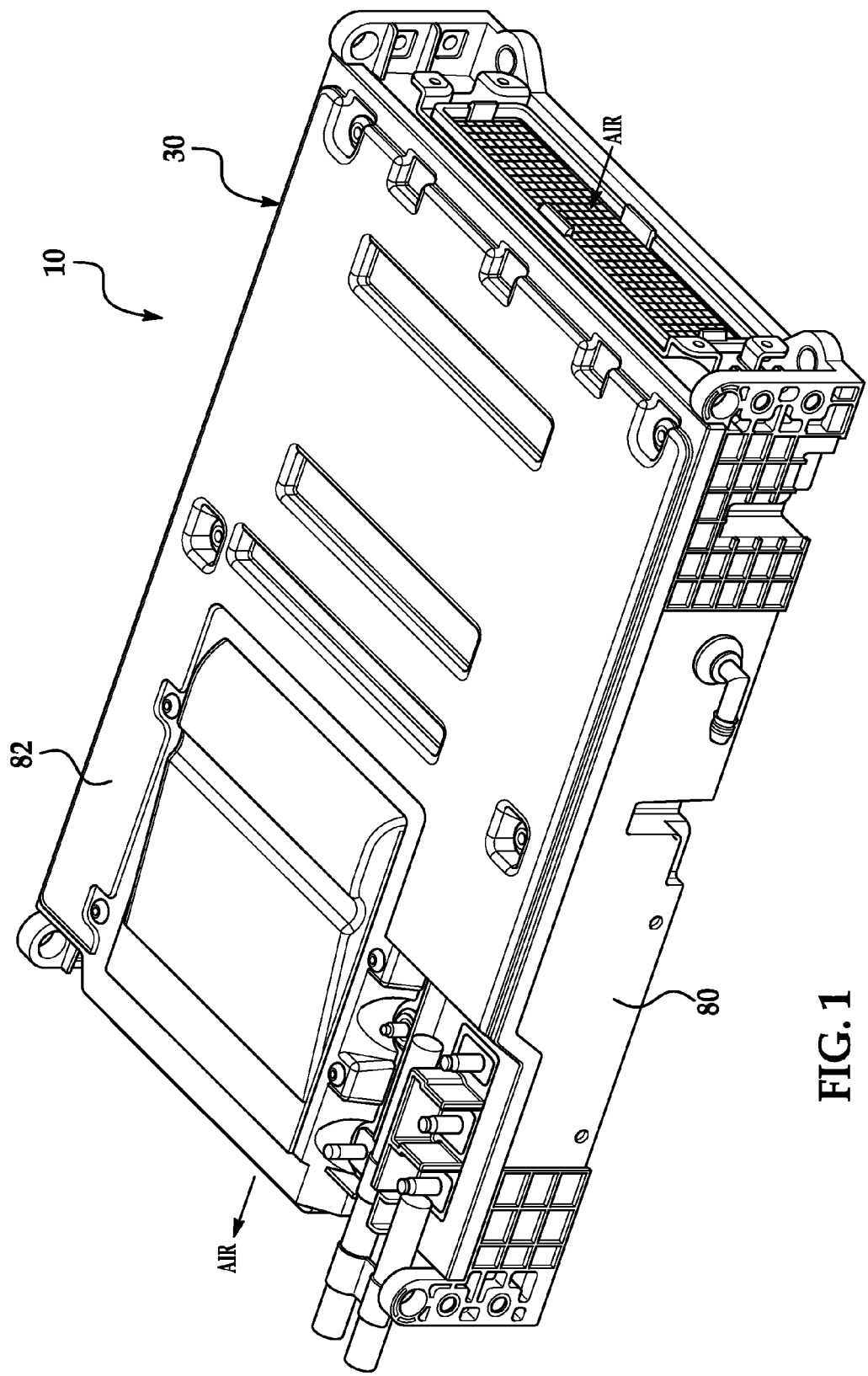
FIG. 1 is a schematic of a battery pack in accordance with an exemplary embodiment.
Figure 2:
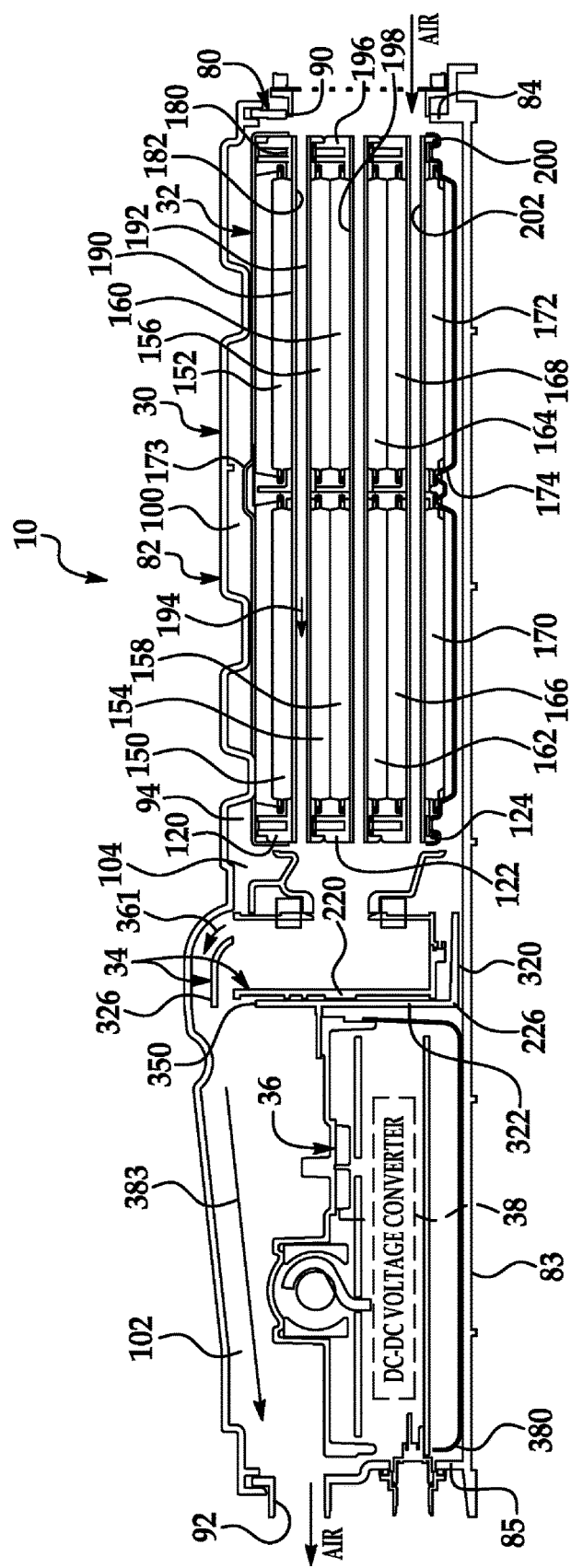
FIG. 2 is a cross-sectional schematic of the battery pack of FIG. 1.
Figures 10, 11:
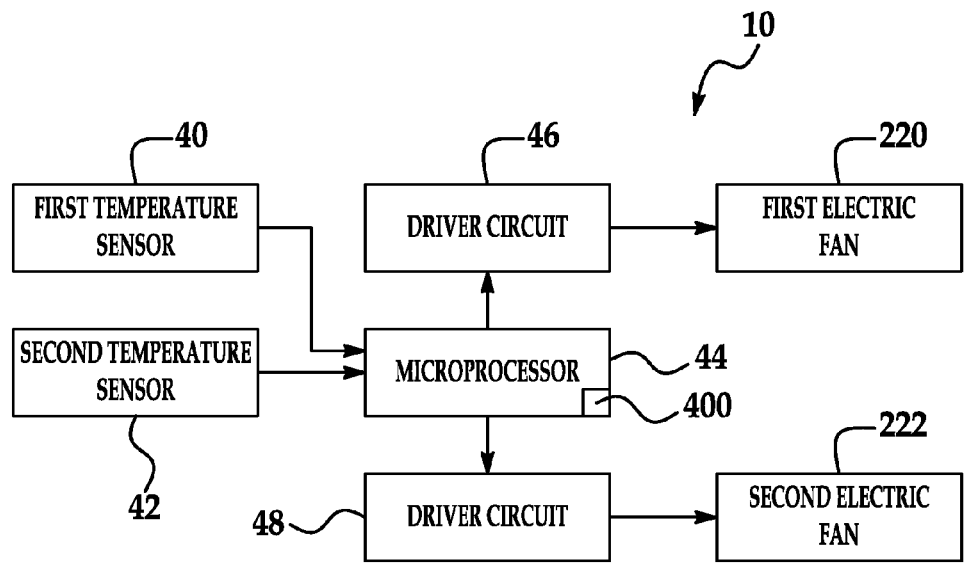
FIG. 10 is a block diagram of a portion of the battery pack of FIG. 1.
FIG. 11 is an exemplary table utilized by a microprocessor in the battery pack of FIG. 1.
Figure 12:
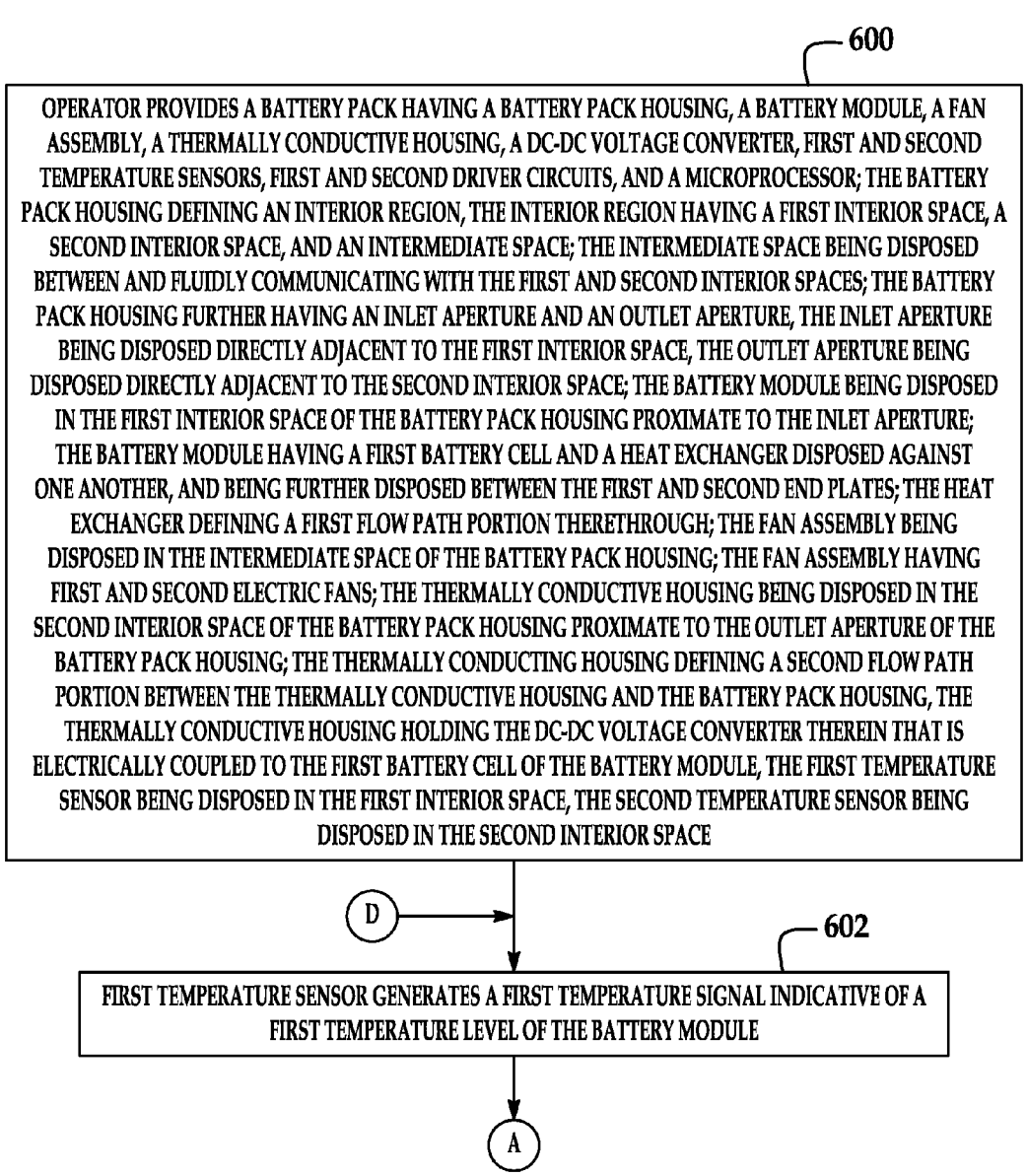
FIGS. 12-14 are flowcharts of a method for controlling a fan assembly for cooling a battery module and a DC-DC voltage converter in the battery pack of FIG. 1 in accordance with another exemplary embodiment.
Figure 13:
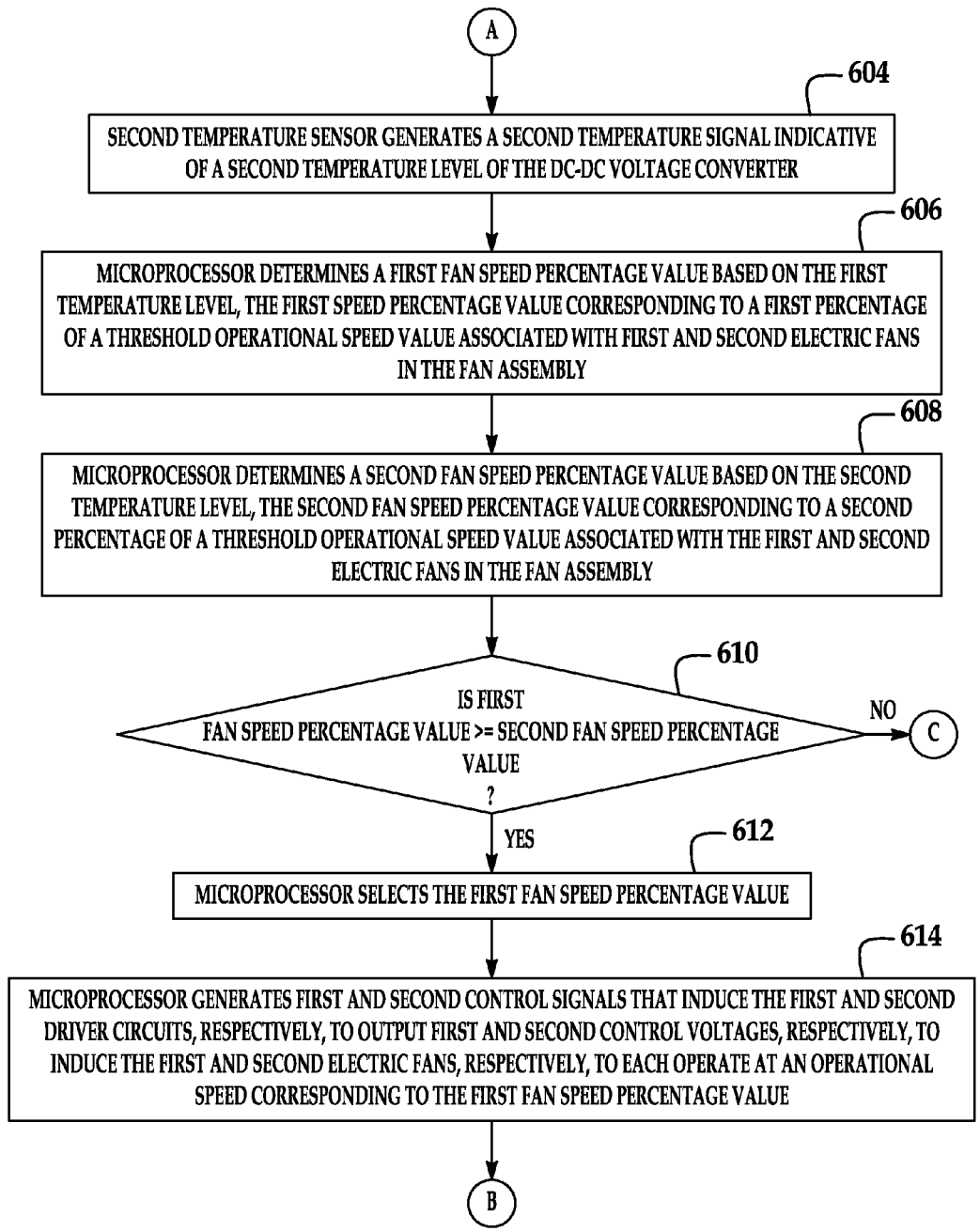
Figure 14:
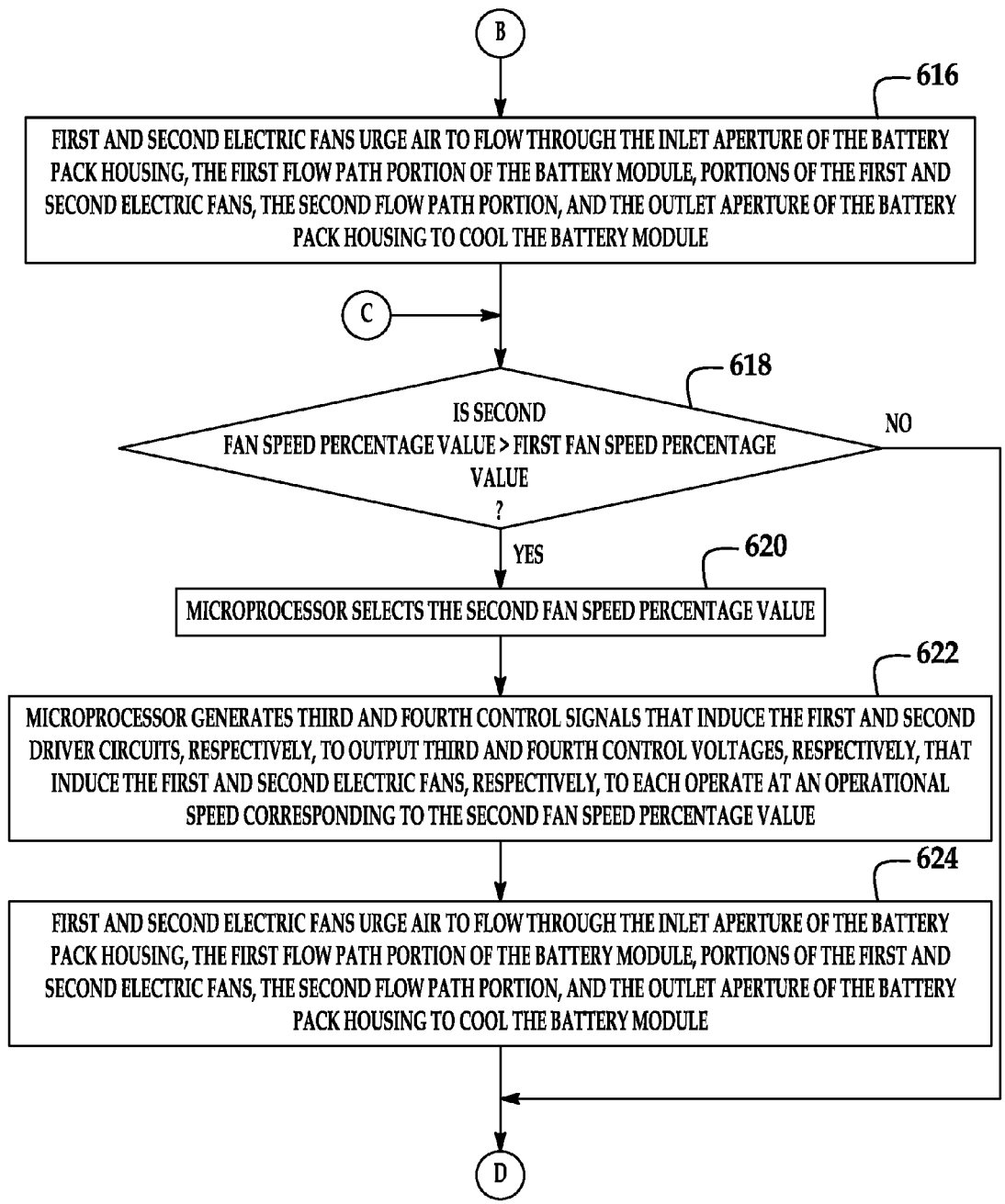

Referring to FIGS. 1, 2 and 10, a battery pack 10 in accordance with an exemplary embodiment is provided. The battery pack 10 includes a battery pack housing 30, a battery module 32, a fan assembly 34, a thermally conductive housing 36, a DC-DC voltage converter 38, first and second temperature sensors 40, 42, a microprocessor 44, and driver circuits 46, 48. An advantage of the battery pack 10 is that the battery pack 10 has the fan assembly 34 disposed in an intermediate space of the battery pack housing 34 that urges air through the battery pack housing 34 to cool the battery module 32. As a result, the emitted sound from the fan assembly 34 is reduced outside of the battery pack housing 30.

Figure 3:
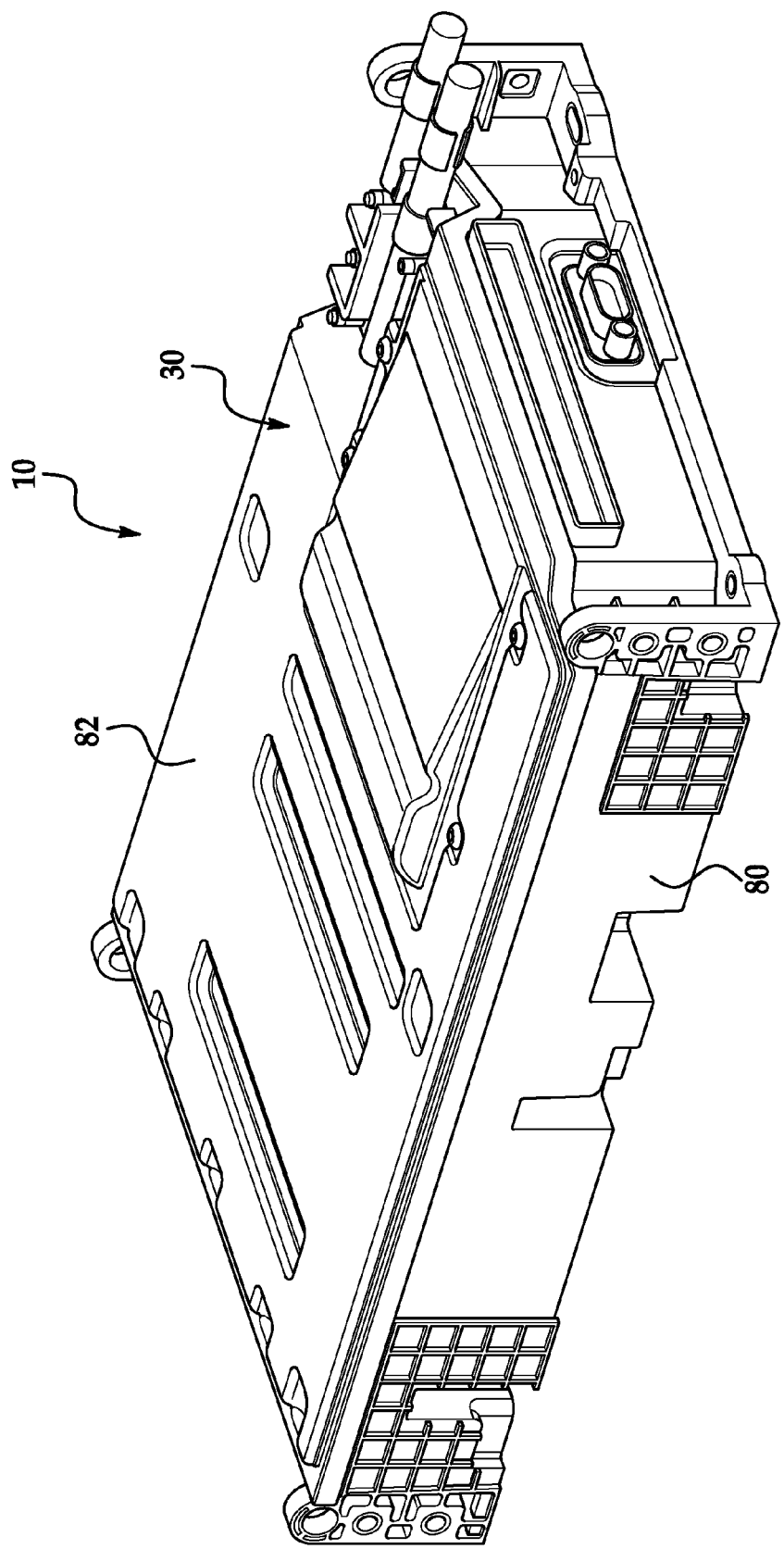
FIG. 3 is another schematic of the battery pack of FIG. 1.
Figure 4:
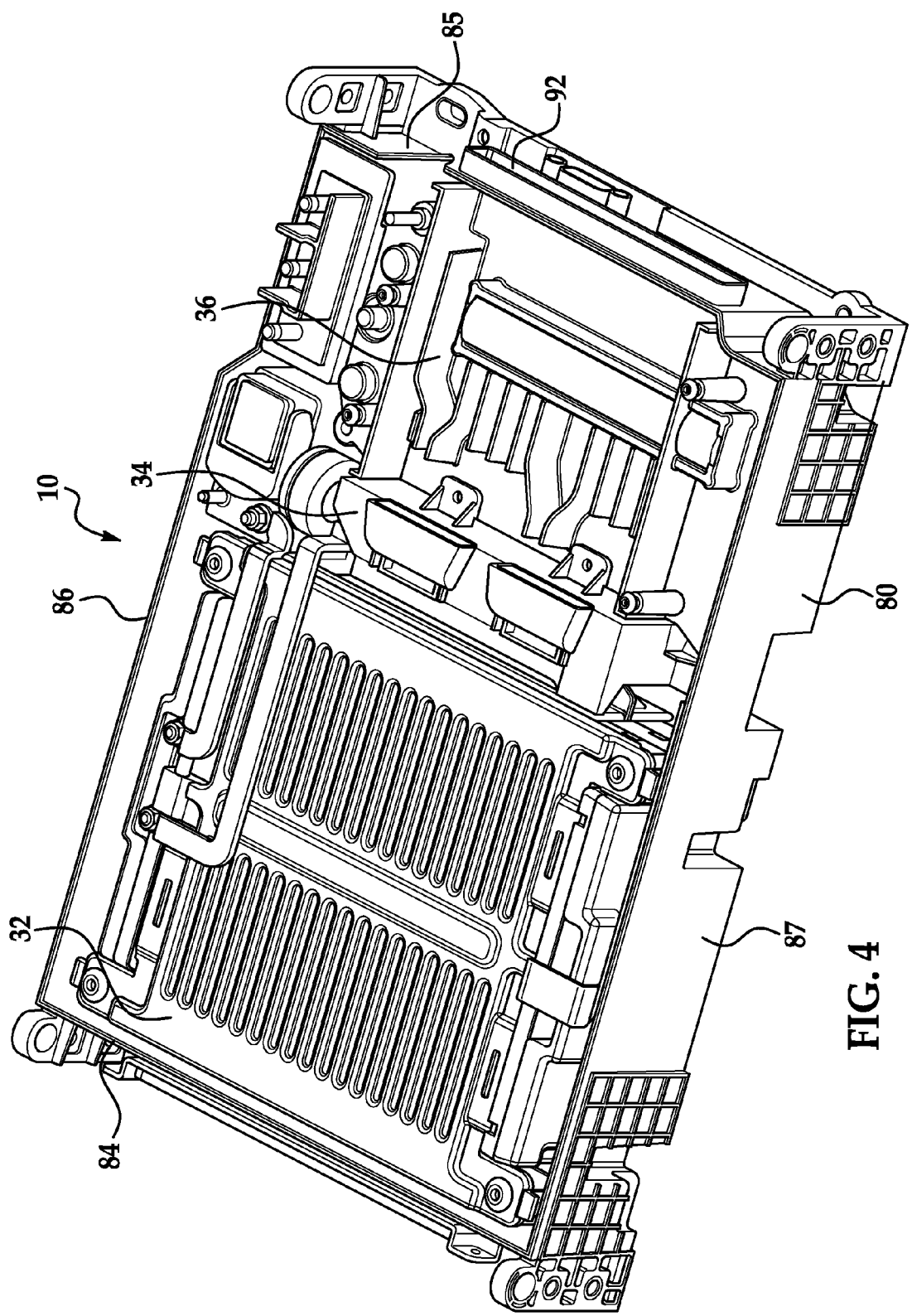
FIG. 4 is another schematic of the battery pack of FIG. 1 with a top cover removed from the battery pack.
Figure 5:
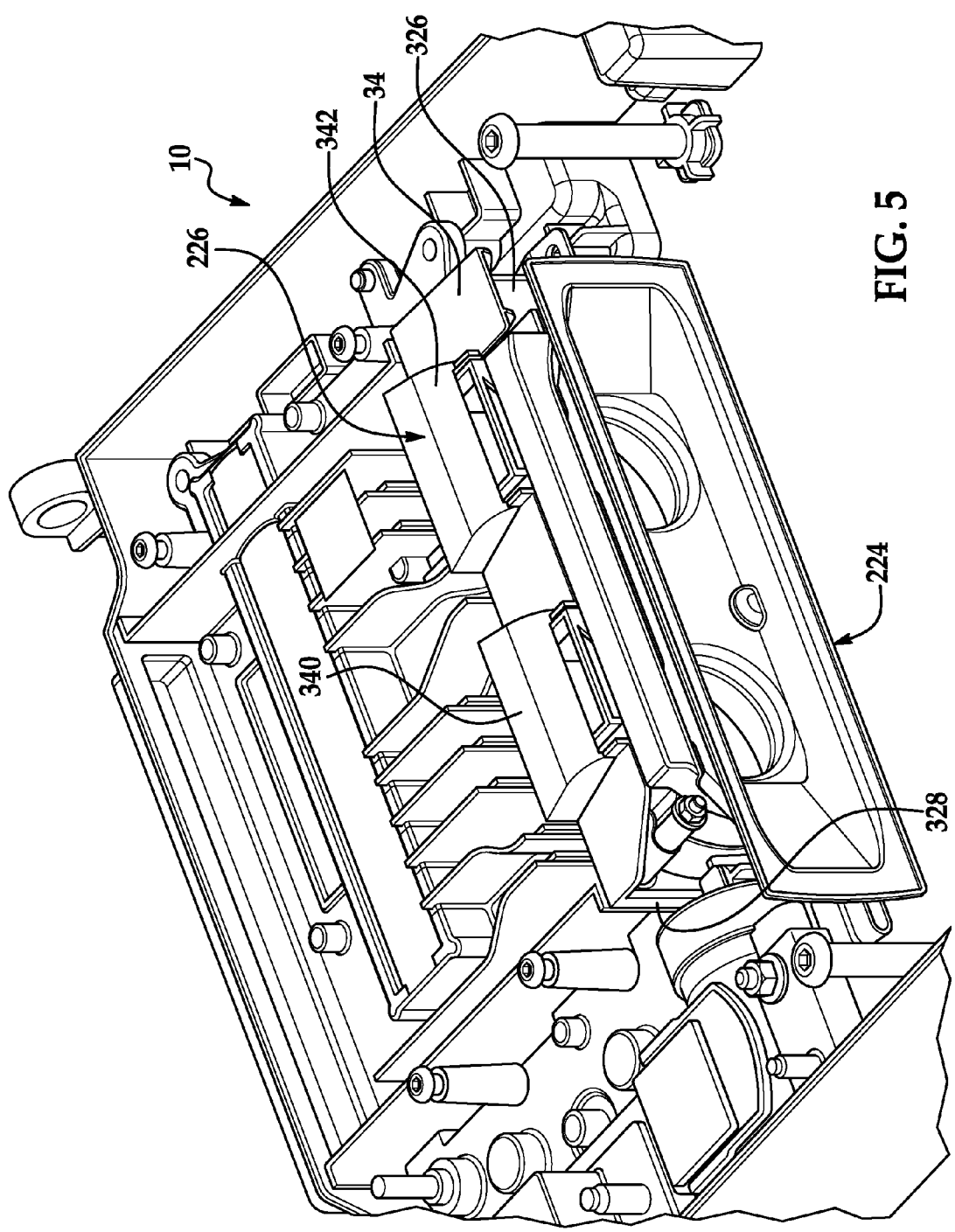
FIG. 5 is a schematic of a fan assembly and a thermally conductive housing utilized in the battery pack of FIG. 1.

Referring to FIGS. 2-4, the battery pack housing 30 is provided to hold the remaining components of the battery pack 10 therein. The battery pack housing 30 has a base portion 80 and a top cover 82 which define an interior region 94 therebetween. The interior region 94 includes a first interior space 100, a second interior space 102, and an intermediate space 104.

The base portion 80 includes a bottom wall 83 (shown in FIG. 2) and side walls 84, 85, 86, 87. The side walls 84, 85, 86, 87 are coupled to the bottom wall 83 and extend upwardly substantially perpendicular to the bottom wall 83. The side walls 84, 85 extend substantially parallel to one another. Further, the side walls 86, 87 extend substantially parallel to one another and perpendicular to the side walls 84, 85. The base portion 80 includes an inlet aperture 90 extending through the side wall 84. The base portion 80 further includes an outlet aperture 92 extending through the side wall 85. The inlet aperture 90 is disposed directly adjacent to and communicates with the first interior space 100, and the outlet aperture 92 is disposed directly adjacent to and communicates with the second interior region 102. In an exemplary embodiment, the base portion 80 is constructed of steel or aluminum. In an alternative embodiment, the base portion 80 is constructed of plastic.

The top cover 82 is removably coupled to the side walls 84, 85, 86, 87 to enclose the interior region 94. In an exemplary embodiment, the top cover 82 is constructed of steel or aluminum. In an alternative embodiment, the top cover 82 is constructed of plastic.

Referring to FIG. 2, the battery module 32 is disposed in the first interior space 100 of the battery pack housing 30 proximate to the inlet aperture 90. The battery module 32 includes frame members 120, 122, 124, battery cells 150, 152, 154, 156, 158, 160, 162, 164, 166, 168, 170, 172 and end plates 173, 174.

Referring to FIGS. 7-10, the frame members 120, 122, 122 are provided to hold the battery cells 154, 156, 158, 160, 162, 164, 166, 168 therebetween. Also, the frame member 120 and the end plate 173 are provided to hold the battery cells 150, 152 therebetween. Further, the frame member 124 and the end plate 174 are provided to hold the battery cells 170, 172 therebetween. The frame member 122 is coupled to and between the frame members 120, 124. The structure of each of the frame members 120, 122, 124 are identical to one another. Accordingly, only the structure of the frame member 120 will be described in detail below.

The frame member 120 has a substantially rectangular ring-shaped outer plastic frame 180 and a heat exchanger 182. The heat exchanger 182 has first and second thermally conductive plates 190, 192 that are coupled together and define a flow path portion 194 that extends therethrough. A first side of the heat exchanger 182 directly contacts the battery cells 150, 152, and a second side of the heat exchanger 182 directly contacts the battery cells 154, 156.

The frame member 122 has an identical structure as the frame member 120 described above. The frame member 122 has a substantially rectangular ring-shaped outer plastic frame 196 and a heat exchanger 198. A first side of the heat exchanger 198 directly contacts the battery cells 166, 168, and a second side of the heat exchanger 198 directly contacts the battery cells 170, 172.

The frame member 124 has an identical structure as the frame member 120 described above. The frame member 124 has a substantially rectangular ring-shaped outer plastic frame 200 and a heat exchanger 202. A first side of the heat exchanger 202 directly contacts the battery cells 150, 152, and a second side of the heat exchanger 202 directly contacts the battery cells 154, 156.

The battery cells 150, 152, 154, 156, 158, 160, 162, 164, 166, 168, 170, 172 are each configured to generate an operational voltage. In one exemplary embodiment, the battery cells 150-172 are pouch-type lithium-ion battery cells that have a substantially rectangular-shaped body portion and a pair of electrical terminals. In an exemplary embodiment, the battery cells 150-172 are electrically coupled in series with one another. In an exemplary embodiment, the structure of the battery cells 150-172 are identical to one another.

Referring to FIGS. 2 and 4-9, the fan assembly 34 is provided to urge air to flow through the inlet aperture 90 of the battery pack housing 30 and further through the interior region 94 of the battery pack housing 30 and through the outlet aperture 92 of the battery pack housing 30 for cooling the battery module 32 and the DC-DC voltage converter 38.

The fan assembly 34 is disposed in the intermediate space 104 of the battery pack housing 30. The fan assembly 34 includes first and second electric fans 220, 222, an inlet funnel member 224, a flow guide assembly 226, bolts 228, 230, 232, 234, and nuts 235, 236, 237, 238. The first and second electric fans 220, 222 are coupled to and disposed between the inlet funnel member 224 and the flow guide member 226.

Referring to FIGS. 2 and 6-8, the first electric fan 220 includes a housing 240 which defines the central aperture 242 and a top outlet portion 244. The first electric fan 220 includes an internal motor and fan blades which urge air into the central aperture 242 and through an interior portion of the housing 240, and the air exits the top outlet portion 244. The housing 240 further includes apertures 250, 252 extending therethrough for receiving the bolts 228, 230, respectively therethrough for coupling the first electric fan 220 to the flow guide assembly 226. The nuts 235, 236 are threadably coupled to the bolts 228, 230, respectively, to hold the first electric fan 220 against the flow guide assembly 226. The driver circuit 46 (shown in FIG. 10) is electrically coupled to the first electric fan 220 and provides a control voltage for controlling operation of the first electric fan 220. During operation, the first electric fan 220 urges air to flow through the inlet aperture 90 of the battery pack housing 30, the flow path portions in the heat exchangers 182, 198, 202 in the battery module 32, a portion of the first electric fan 220, a second flow path portion 383 between the thermally conductive housing 36 and the top cover 82 of the battery pack housing 30, and the outlet aperture 92 of the battery pack housing 30 to cool the battery module 32 and the DC-DC voltage converter 38.

The second electric fan 222 includes a housing 270 which defines the central aperture 272 and a top outlet portion 274. The second electric fan 222 includes an internal motor and fan blades which urge air into the central aperture 272 and through an interior portion of the housing 270, and the air exits the top outlet portion 274. The housing 270 further includes apertures 280, 282 extending therethrough for receiving the bolts 232, 234, respectively therethrough for coupling the second electric fan 222 to the flow guide assembly 226. The nuts 237, 238 are threadably coupled to the bolts 232, 234, respectively, to hold the second electric fan 222 against the flow guide assembly 226. The driver circuit 48 (shown in FIG. 10) is electrically coupled to the second electric fan 222 and provides a control voltage for controlling operation of the second electric fan 222. During operation, the second electric fan 222 urges air to flow through the inlet aperture 90 of the battery pack housing 30, the flow path portions in the heat exchangers 182, 198, 202 in the battery module 32, a portion of the second electric fan 222, the second flow path portion 383 between the thermally conductive housing 36 and the top cover 82 of the battery pack housing 30, and the outlet aperture 92 of the battery pack housing 30 to cool the battery module 32 and the DC-DC voltage converter 38.

Figure 6:
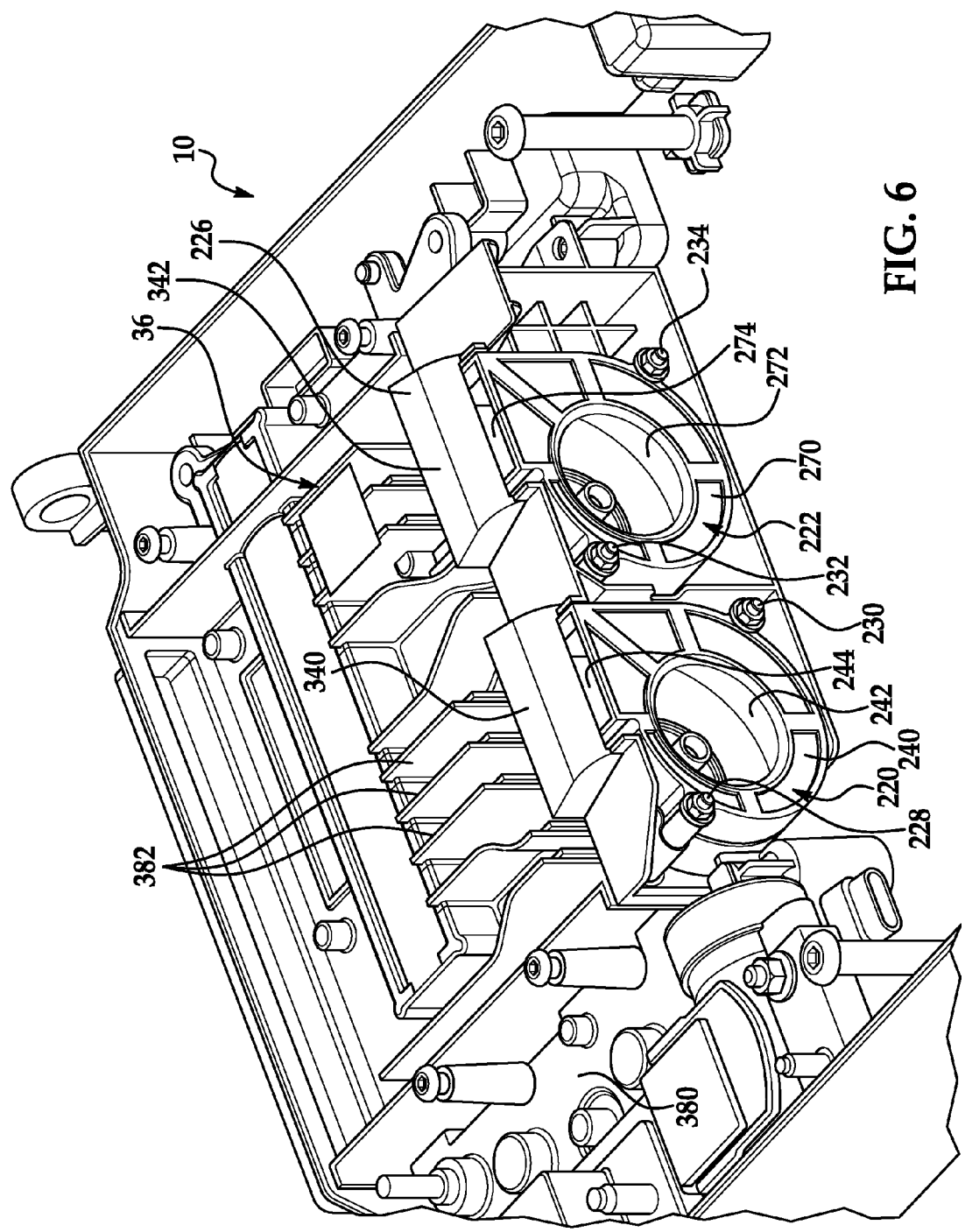
FIG. 6 is another schematic of the fan assembly and the thermally conductive housing of FIG. 5.
Figure 9:
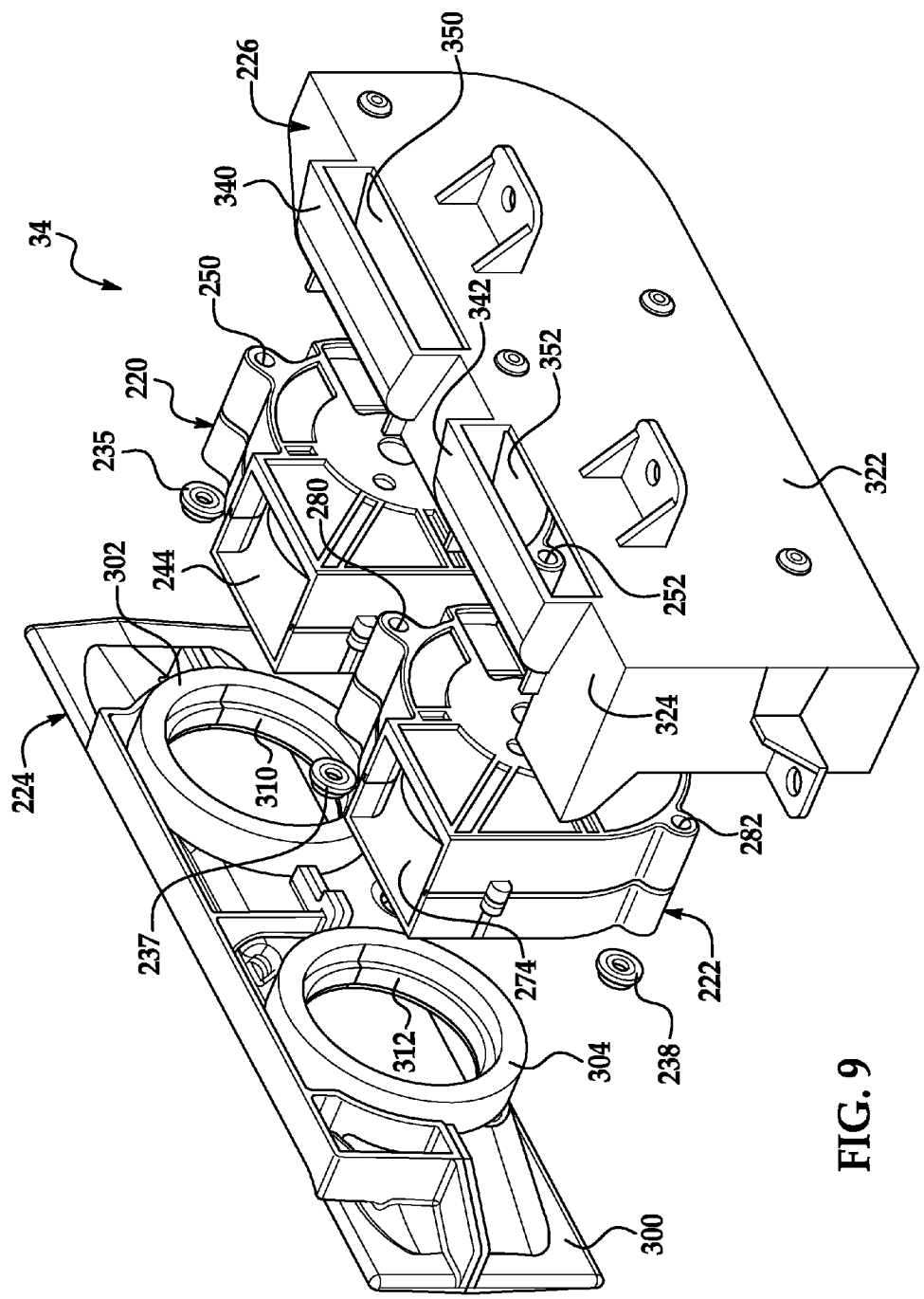
FIG. 9 is another exploded schematic of the fan assembly of FIG. 5.

Referring to FIGS. 2, 6 and 9, the inlet funnel member 224 is provided to route air received from the heat exchangers 182, 198, 202 of the battery module 32 into the first and second electric fans 220, 222. The inlet funnel member 224 includes a frame member 300 and elastomeric gaskets 302, 304. The frame member 300 includes apertures 310, 312 extending therethrough.

The gasket 302 is coupled to a side of the frame member 300 facing the first electric fan 220, and is further disposed adjacent to the aperture 310 of the frame member 300 and the central aperture 242 of the first electric fan 220, to direct air from the aperture 310 into the central aperture 242. The aperture 310 of the frame member 300 communicates with the central aperture 242 of the first electric fan 220 and has a diameter substantially equal to a diameter of the central aperture 242.

The gasket 304 is coupled to the side of the frame member 300 facing the second electric fan 222, and is further disposed adjacent to the aperture 312 of the frame member 300 and the central aperture 272 of the second electric fan 222, to direct air from the aperture 312 into the central aperture 272. The aperture 312 of the frame member 300 communicates with the central aperture 272 of the second electric fan 222 and has a diameter substantially equal to a diameter of the central aperture 272.

Figure 7:
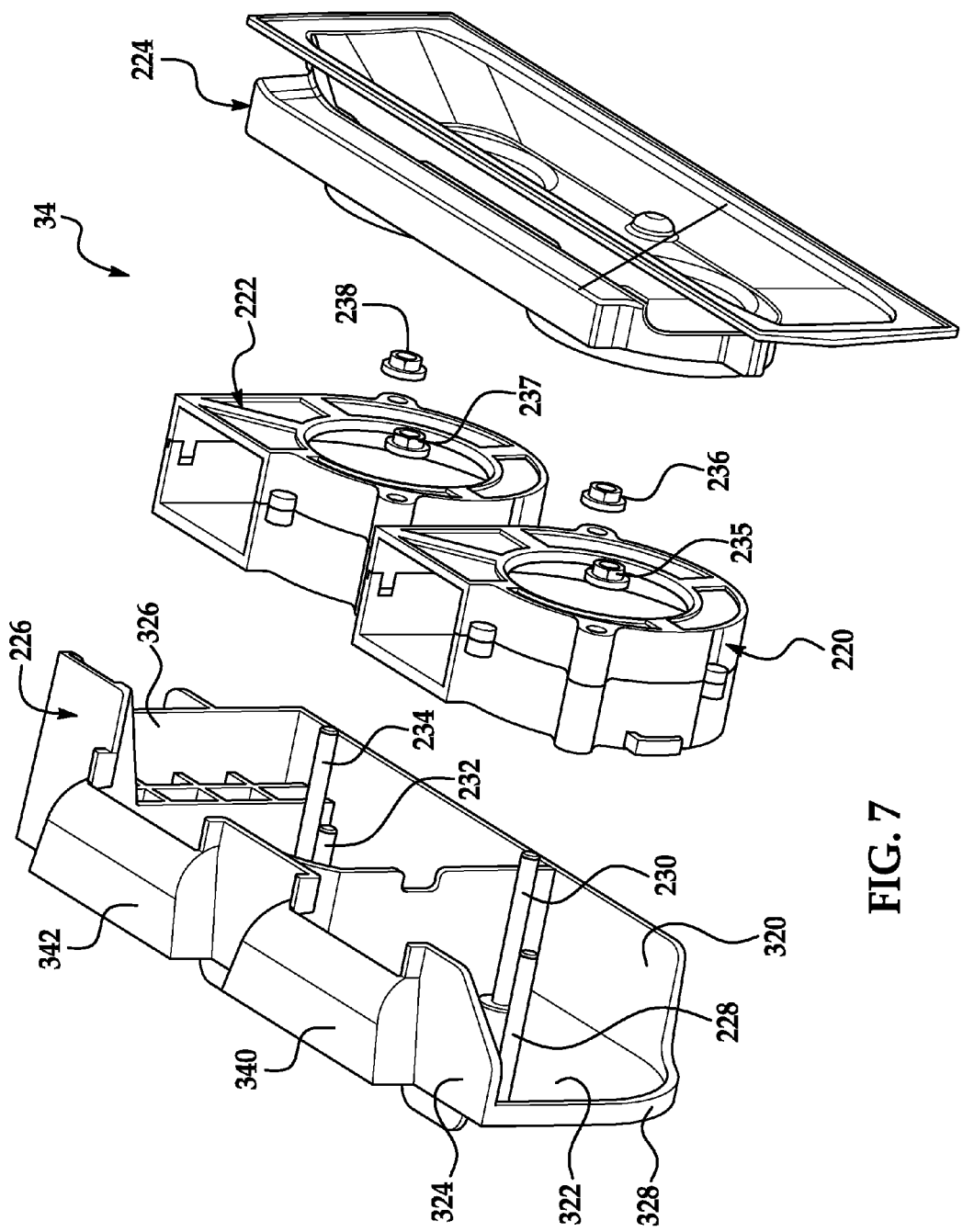
FIG. 7 is an exploded schematic of the fan assembly of FIG. 5.
Figure 8:
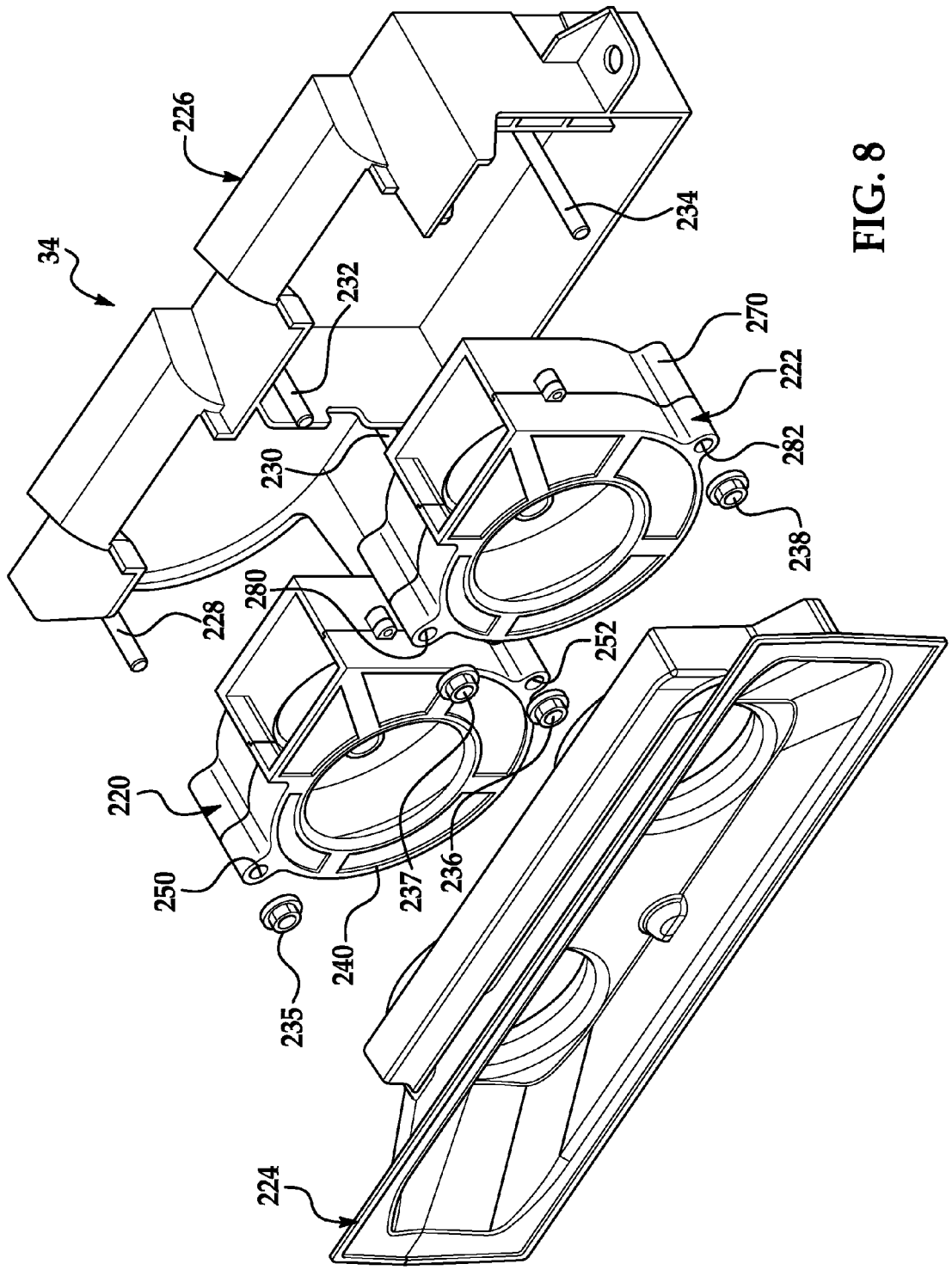
FIG. 8 is another exploded schematic of the fan assembly of FIG. 5.

Referring to FIGS. 2, 7 and 9, the flow guide assembly 226 is provided to direct air from the first and second electric fans 220, 222 into the second interior space 102. The flow guide assembly 226 includes a bottom wall 320, a rear wall 322, a top wall 324, side walls 326, 328, and first and second flow guide members 340, 342.

A bottom end of the rear wall 322 is coupled to and extends from the bottom wall 320 in a first direction substantially perpendicular to the bottom wall 320. Bottom ends of the side walls 326, 328 are coupled to opposite ends of the bottom wall 320 and extend from the bottom wall 320 in the first direction substantially perpendicular to the bottom wall 320. Also, the side walls 326, 328 are coupled to the rear wall 322 and extend substantially perpendicular to the rear wall 322 in a second direction toward the inlet funnel member 224. The top wall 324 is coupled to a top end of the rear wall 322 and extends from the rear wall 322 in the second direction toward the inlet funnel member 224.

The first flow guide member 340 is coupled to and extends from a top end of the rear wall 322 in the second direction toward the inlet funnel member 224. The first flow guide member 340 is further coupled to a portion of the top wall 324, and is disposed a predetermined distance away from the bottom wall 320. The rear wall 322 has a first flow aperture 350 (shown in FIG. 9) extending therethrough that is disposed proximate to the first flow guide member 340 and below the first flow guide member 340.

The first electric fan 220 directs air through the top outlet portion 244 toward the first flow guide member 340 that is disposed above the top outlet portion 244 such that a portion of the air flowing from the first electric fan 220 contacts a bottom surface of the first flow guide member 340 and flows through the aperture 350 into the second interior space 102, and another portion of the air flowing from the first electric fan 220 flows through a flow region 361 defined between a top surface of the first flow guide member 340 and a bottom surface of the top cover 82 of the battery pack housing 30 and into the second interior space 102.

The second flow guide member 342 is coupled to and extends from a top end of the rear wall 322 in the second direction toward the inlet funnel member 224. The second flow guide member 342 is further coupled to a portion of the top wall 324, and is disposed a predetermined distance away from the bottom wall 320. The rear wall 322 has a second flow aperture 352 (shown in FIG. 9) extending therethrough that is disposed proximate to the second flow guide member 342 and below the second flow guide member 342.

The second electric fan 222 directs air through the top outlet portion 274 toward the second flow guide member 342 that is disposed above the top outlet portion 274 such that a portion of the air flowing from the second electric fan 222 contacts a bottom surface of the second flow guide member 342 and flows through the aperture 352 into the second interior space 102, and another portion of the air flowing from the second electric fan 222 flows through a flow region defined between the top surface of the second flow guide member 342 and a bottom surface of the top cover 82 of the battery pack housing 30 and into the second interior space 102.

Referring to FIGS. 2 and 6, the thermally conductive housing 36 is provided to hold the DC-DC voltage converter 38 therein that is electrically coupled to the battery cells of the battery module 32. The thermally conductive housing 36 transfers heat from the DC-DC voltage converter 38 to air flowing in the flow path portion 383 past the thermally conductive housing 36. The thermally conductive housing 36 is disposed in the second interior space 102 of the interior region 94 of the battery pack housing 30 between the battery module 32 and the outlet aperture 92 of the battery pack housing 30. The thermally conductive housing 36 defines the flow path portion 383 between the thermally conductive housing 36 and the top cover 82 of the battery pack housing 30, and the flow path portion 383 fluidly communicates with the flow path portions (e.g., flow path portion 194) of the battery module 32 and with the outlet aperture 92.

The thermally conductive housing 36 includes a housing portion 380 and a plurality of cooling fins 382 coupled to a top end of the housing portion 380. Each of the plurality of cooling fins 382 are spaced apart from one another such that air flows between the cooling fins 382. In an exemplary embodiment, the thermally conductive housing 36 is constructed of aluminum. Of course, in an alternative embodiment, the thermally conductive housing 36 can be constructed of other materials such as steel or other metal alloys for example.

Referring to FIGS. 2 and 10, the first temperature sensor 40 is disposed in the first interior space 100 of the interior region 94 of the battery pack housing 30 proximate to at least one battery cell of the battery module 32. The first temperature sensor 40 is configured to generate a temperature signal indicative of a temperature level of the battery module 32.

The second temperature sensor 42 is disposed in the second interior space 102 of the interior region 94 of the battery pack housing 30 proximate to the DC-DC voltage converter 38. The second temperature sensor 42 is configured to generate a temperature signal indicative of a temperature level of the DC-DC voltage converter 38.

The microprocessor 44 is operably and electrically coupled to the first temperature sensor 40, the second temperature sensor 42, and the driver circuits 46, 48. In an exemplary embodiment, the microprocessor 44 is programmed to receive first and second temperature signals from the first and second temperature sensors 40, 42, respectively, and to generate first and second voltage signals based on the first and second temperature signals, respectively, to induce the driver circuits 46, 48, respectively, to control operation of the first and second electric fans 220, 222 respectively, as will be described in greater detail below. The microprocessor 44 has a memory device 400 which stores software instructions and data for implementing at least portions of the method for controlling the first and second electric fans 220, 222.

Referring to FIGS. 10 and 11, an exemplary table 500 stored in the memory device 400 which can be utilized by the microprocessor 44 for controlling an operational speed of the first and second electric fans 220, 222 for cooling the battery module 32 and the DC-DC voltage converter 38 is illustrated. The table 500 includes records 502, 504, 506, 508, 510, 512, 514, 516, 518, 520, 522. Each record includes the following fields: (i) fan speed percentage value, (ii) battery cell temperature and (iii) DC-DC voltage converter temperature. The fan speed percentage value corresponds to a percentage of a threshold or maximum operational speed (e.g., 13,000 RPM) associated with each of the first and second electric fans 220, 222. The microprocessor 44 determines a battery cell temperature level, and a DC-DC voltage converter temperature level and then utilizes these values as indexes in the table 500 to determine corresponding fan speed percentage values for each of the first and second electric fans 220, 222. Then, the microprocessor 44 selects the highest fan speed percentage value from the two values, and then generates a control value that induces the first and second electric fans 220, 222 to operate at an operational speed corresponding to the highest fan speed percentage value. For example, if a battery cell temperature value equals 38 degrees Celsius, the microprocessor 44 can access the record 504 and select a first fan speed percentage value of 0.1 corresponding to 10% of a threshold operational speed of each of the first and second electric fans 220, 222. Further, if a DC-DC voltage converter temperature value equals 90 degrees Celsius, the microprocessor 44 can access the record 506 and select a second fan speed percentage value of 0.2 corresponding to 20% of a threshold operational speed of each of the first and second electric fans 220, 222. Thereafter, the microprocessor 44 selects the highest of the fan speed percentage value of 0.1 and 0.2 which corresponds to 0.2 for controlling each of the first and second electric fans 220, 222.

Referring to FIGS. 2, 10, 12-14, a flowchart of a method for controlling the fan assembly 34 for cooling the battery module 32 and the DC-DC voltage converter 38 in accordance with another exemplary embodiment is provided.

At step 600, the operator provides the battery pack 10 having the battery pack housing 30, the battery module 32, the fan assembly 34, the thermally conductive housing 36, the DC-DC voltage converter 38, first and second temperature sensors 40, 42, first and second driver circuits 46, 48, and the microprocessor 44. The battery pack housing 30 defines the interior region 94. The interior region 94 has the first interior space 100, the second interior space 102, and the intermediate space 104. The intermediate space 104 is disposed between and fluidly communicates with the first and second interior spaces 100, 102. The battery pack housing 30 further includes the inlet aperture 90 and the outlet aperture 92. The inlet aperture 90 is disposed directly adjacent to the first interior space 100. The outlet aperture 92 is disposed directly adjacent to the second interior space 102. The battery module 32 is disposed in the first interior space 100 of the battery pack housing 30 proximate to the inlet aperture 90. The battery module 32 has the battery cell 150 and the heat exchanger 182 disposed against one another. The heat exchanger 182 defines the first flow path portion 194 therethrough. The fan assembly 34 is disposed in the intermediate space 104 of the battery pack housing 30. The fan assembly 34 has first and second electric fans 220, 222. The thermally conductive housing 36 is disposed in the second interior space 102 of the battery pack housing 30 proximate to the outlet aperture 92 of the battery pack housing 30. The thermally conductive housing 36 defines a second flow path portion 383 between the thermally conductive housing 36 and the battery pack housing 30. The thermally conductive housing 36 holds the DC-DC voltage converter 38 therein that is electrically coupled to the battery cell 150 of the battery module 32. The first temperature sensor 40 is disposed in the first interior space 100, and the second temperature sensor 42 is disposed in the second interior space 102. After step 600, the method advances to step 602.

At step 602, the first temperature sensor 40 generates a first temperature signal indicative of a first temperature level of the battery module 32. After step 602, the method advances to step 604.

At step 604, the second temperature sensor 42 generates a second temperature signal indicative of a second temperature level of the DC-DC voltage converter 38. After step 604, the method advances to step 606.

At step 606, the microprocessor 44 determines a first fan speed percentage value based on the first temperature level. The first fan speed percentage value corresponds to a first percentage of a threshold operational speed value associated with first and second electric fans 220, 222 in the fan assembly 34. After step 606, the method advances to step 608.

At step 608, the microprocessor 44 determines a second fan speed percentage value based on the second temperature level. The second fan speed percentage value corresponds to a second percentage of the threshold operational speed value associated with the first and second electric fans 220, 222 in the fan assembly 34. After step 608, the method advances to step 610.

At step 610, the microprocessor 44 makes a determination as to whether the first fan speed percentage value is greater than or equal to the second fan speed percentage value. If the value of step 610 equals "yes", the method advances to step 612. Otherwise, the method advances to step 618.

At step 612, the microprocessor 44 selects the first fan speed percentage value. After step 612, the method advances to step 614.

At step 614, the microprocessor 44 generates first and second control signals that induce the first and second driver circuits 46, 48, respectively, to output first and second control voltages, respectively, to induce the first and second electric fans 220, 222, respectively, to each operate at an operational speed corresponding to the first fan speed percentage value. After step 614, the method advances to step 616.

At step 616, the first and second electric fans 220, 222 urge air to flow through the inlet aperture 90 of the battery pack housing 30, the first flow path portion 194 of the battery module 32, portions of the first and second electric fans 220, 222, the second flow path portion 383, and the outlet aperture 92 of the battery pack housing 30 to cool the battery module 32. After step 616, the method advances to step 618.

At step 618, the microprocessor 44 makes a determination as to whether the second fan speed percentage value is greater than the first fan speed percentage value. If the value of step 618 equals "yes", the method advances to step 620. Otherwise, the method returns to step 602.

At step 620, the microprocessor 44 selects the second fan speed percentage value. After step 620, the method advances to step 622.

At step 622, the microprocessor 44 generates third and fourth control signals that induce the first and second driver circuits 46, 48, respectively, to output third and fourth control voltages, respectively, that induce the first and second electric fans 220, 222, respectively, to each operate at an operational speed corresponding to the second fan speed percentage value. After step 622, the method advances to step 624.

At step 624, the first and second electric fans 220, 222 urge air to flow through the inlet aperture 90 of the battery pack housing 30, the first flow path portion 194 of the battery module 32, portions of the first and second electric fans 220, 222, the second flow path portion 383, and the outlet aperture 92 of the battery pack housing 30 to cool the battery module 32. After step 624, the method returns to step 602.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more computers or microprocessors, the one or more computers or microprocessors become an apparatus programmed to practice the associated steps of the method.

The battery pack and the method for controlling the fan assembly provide a substantial advantage over other battery packs and methods. In particular, the battery pack utilizes a fan assembly disposed in an intermediate space of the battery pack housing between a battery module and a thermally conductive housing such that the fan assembly urges air through the battery pack housing to cool the battery module and the DC-DC voltage converter. As a result, the emitted sound from the fan assembly is reduced outside of the battery pack housing.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
   a battery pack housing defining an interior region, the interior region having a first interior space, a second interior space, and an intermediate space; the intermediate space being disposed between and fluidly communicating with the first and second interior spaces; the battery pack housing further having an inlet aperture and an outlet aperture, the inlet aperture fluidly being disposed directly adjacent to the first interior space, the outlet aperture being disposed directly adjacent to the second interior space;
   a battery module being disposed in the first interior space of the battery pack housing proximate to the inlet aperture; the battery module having a first battery cell and a heat exchanger disposed against one another; the heat exchanger defining a first flow path portion therethrough;
   a fan assembly being disposed in the intermediate space of the battery pack housing; the fan assembly having a first electric fan, the fan assembly further having an inlet funnel member and a flow guide assembly; the first electric fan being coupled to and disposed between the inlet funnel member and the flow guide assembly;
   a thermally conductive housing being disposed in the second interior space of the battery pack housing proximate to the outlet aperture of the battery pack housing; the thermally conductive housing defining a second flow path portion between the thermally conductive housing and the battery pack housing;
   the first electric fan adapted to urge air to flow through the inlet aperture, the first flow path portion, a portion of the first electric fan, the second flow path portion, and the outlet aperture of the battery pack housing to cool the battery module;
   the battery pack housing includes a base portion and a top cover, the top cover being coupled to the base portion; the base portion having the inlet aperture and the outlet aperture extending therethrough;
   the flow guide assembly of the fan assembly having a bottom wall, a rear wall, and a first flow guide member; the rear wall being coupled to and extending from the bottom wall in a first direction substantially perpendicular to the bottom wall; the first flow guide member being coupled to and extending from the rear wall toward the inlet funnel member, the first flow guide member being disposed a predetermined distance away from the bottom wall, the rear wall having a first flow aperture extending therethrough that is disposed proximate to the fist flow guide member; and
   the first electric fan of the fan assembly having a first top outlet portion that directs the air flowing therethrough toward the first flow guide member disposed above the first top outlet portion such that a portion of the air flowing from the first electric fan contacts a bottom surface of the first flow guide member and flowing from the first electric fan flows through a first flow region defined between a top surface of the first flow guide member and a bottom surface of the top cover of the battery pack housing and into the second interior space;
   the fan assembly further includes a second electric fan;
   the flow guide assembly of the fan assembly further includes a second flow guide member being coupled to and extending from the rear wall toward the inlet funnel member, the second flow guide member being disposed the predetermined distance away from the bottom wall, the rear wall having a second flow aperture extending therethrough that is disposed proximate to the second flow guide member; and
   the second electric fan of the fan assembly having a second top outlet portion that directs the air flowing therethrough toward the second flow guide member disposed above the second top outlet portion such that a portion of the air flowing from the second electric fan contacts a bottom surface of the second flow guide member and flows through the second flow aperture into the second interior space, and another portion of the air flowing from the second electric fan flows through a second flow region defined between a top surface of the second flow guide member and the bottom surface of the top cover of the battery pack housing and into the second interior space.

2. The battery pack of claim 1, wherein the inlet funnel member has a first aperture extending therethrough that fluidly communicates with a central aperture of the first electric fan.

3. A battery pack comprising:
   a battery pack housing defining an interior region, the interior region having a first interior space, a second interior space, and an intermediate space; the intermediate space being disposed between and fluidly communicating with the first and second interior space; the battery pack housing further having an inlet aperture and an outlet aperture, the inlet aperture fluidly being disposed directly adjacent to the first interior space, the outlet aperture being disposed directly adjacent to the second interior space;
   a batter module being disposed in the first interior space of the batter pack housing proximate to the inlet aperture; the battery module having a first battery cell and a heat exchanger disposed against one another, the heat exchanger defining a first flow path portion therethrough;
   a fan assembly being disposed in the intermediate space of the battery pack housing; the fan assembly having a first electric fan;
   a thermally conductive housing being disposed in the second interior space of the battery pack housing proximate to the outlet aperture of the batter pack housing; the thermally conductive housing defining a second flow path portion between the thermally conductive housing and the batter pack housing, the thermally conductive housing holding a DC-DC voltage converter that is electrically coupled to the first batter cell of the batter module;
   the first electric fan adapted to urge air to flow through the inlet aperture, the first flow path portion, a portion of the first electric fan, the second flow path portion, and the outlet aperture of the batter pack housing to cool the batter module;
   a first temperature sensor being disposed in the first interior space, the first temperature sensor adapted to generate a first temperature signal indicative of a first temperature level of the battery module;

a second temperature sensor being disposed in the second interior space, the second temperature sensor adapted to generate a second temperature signal indicative of a second temperature level of the DC-DC voltage converter;

a microprocessor operably coupled to the first and second temperature sensors such that the microprocessor receives the first and second temperature signals, respectively, the microprocessor further operably coupled to a driver circuit that is further operably coupled to the first electric fan;

the microprocessor being programmed to determine a first fan speed percentage value of the first electric fan based on the first temperature level, the first fan speed percentage value corresponding to a first percentage of a threshold operational speed value associated with the first electric fan;

the microprocessor being further programmed to determine a second fan speed percentage value of the first electric fan based on the second temperature level, the second fan speed percentage value corresponding to a second percentage of the threshold operational speed value associated with the first electric fan; and the microprocessor being further programmed to select the first fan speed percentage value if the first fan speed percentage value is greater than the second fan speed percentage value.

4. The battery pack of claim 3, wherein:
the microprocessor being further programmed to generate a first control signal that induces the driver circuit to output a first control voltage to induce the first electric fan to operate at a first operational speed corresponding to the first fan speed percentage value if the first fan speed percentage value is selected.

5. The battery pack of claim 4, wherein:
the microprocessor being further programmed to select the second fan speed percentage value if the second fan speed percentage value is greater than the first fan speed percentage value; and
the microprocessor being further programmed to generate a second control signal that induces the driver circuit to output a second control voltage that induces the first electric fan to operate at a second operational speed corresponding to the second fan speed percentage value if the second fan speed percentage value is selected.

6. The battery pack of claim 1, wherein the thermally conductive housing has a plurality of cooling fins.

7. The battery pack of claim 6, wherein the thermally conductive housing is constructed of aluminum.

8. The battery pack of claim 1, wherein the first battery cell is disposed against a first side of the heat exchanger, the battery module further having a second battery cell disposed against the first side of the heat exchanger.

9. The battery pack of claim 1, wherein the heat exchanger comprises first and second thermally conductive plates being coupled together and defining the first flow path portion extending therethrough.

10. The battery pack of claim 9, wherein the first and second thermally conductive plates are constructed of aluminum.

11. A battery pack, comprising:
a battery pack housing defining an interior region, the interior region having a first interior space, a second interior space, and an intermediate space; the intermediate space being disposed between and fluidly communicating with the first and second interior spaces; the battery pack housing further having an inlet aperture and an outlet aperture, the inlet aperture fluidly being disposed directly adjacent to the first interior space, the outlet aperture being disposed directly adjacent to the second interior space;

a battery module being disposed in the first interior space of the battery pack housing proximate to the inlet aperture; the battery module having a first battery cell and a heat exchanger disposed against one another; the heat exchanger defining a first flow path portion therethrough;

a thermally conductive housing being disposed in the second interior space of the battery pack housing proximate to the outlet aperture of the battery pack housing; the thermally conductive housing defining a second flow path portion between the thermally conductive housing and the battery pack housing;

a DC-DC voltage converter being disposed within the thermally conductive housing in the second interior space proximate to the outlet aperture of the battery pack housing, the DC-DC voltage converter being electrically coupled to the first battery cell of the battery module;

a fan assembly being disposed in the intermediate space of the battery pack housing between the battery module and the DC-DC voltage converter in a longitudinal direction such that the DC-DC voltage converter is disposed between the fan assembly and the outlet aperture, the longitudinal direction extending from the inlet aperture of the battery pack housing toward the outlet aperture of the battery pack housing; and the fan assembly having a first electric fan that urges air to flow through the inlet aperture, the first flow path portion, a portion of the first electric fan, the second flow path portion, and the outlet aperture of the battery pack housing to cool the battery module.

12. The battery pack of claim 11, wherein the battery module is further disposed between the fan assembly and the inlet aperture in the longitudinal direction.

13. The battery pack of claim 11, wherein the fan assembly further includes a second electric fan that urges the air to flow through the inlet aperture, the first flow path portion, a portion of the second electric fan, the second flow path portion, and the outlet aperture of the battery pack housing to cool the battery module.

14. The battery pack of claim 11, further comprising a microprocessor disposed in the interior region, the microprocessor generating a control signal to induce the first electric fan to operate at a first operational speed based on a temperature level of the first battery cell and a temperature level of the DC-DC voltage converter.

15. The battery pack of claim 11, wherein the heat exchanger routes the air in the longitudinal direction through the first flow path portion.

* * * * *